July 3, 1951 A. J. BARACKET 2,559,144

GENERATION OF SINE WAVES

Filed Jan. 29, 1949

INVENTOR
A. J. Baracket
BY Darby & Darby
ATTORNEYS

Patented July 3, 1951

2,559,144

UNITED STATES PATENT OFFICE 2,559,144

GENERATION OF A SINE WAVE

Albert J. Baracket, Bloomfield, N. J., assignor to Allen B. Du Mont Laboratories, Inc., Passaic, N. J., a corporation of Delaware Application January 29, 1949, Serial No. 73,650

1 Claim. (Cl. 250—27)

My invention relates to electronic signal voltage generating circuits and more particularly to means for deriving a sinusoidal voltage wave from an impulse type voltage wave.

In many electronic systems such as television, it is desirable to generate in a particular part of the system a sinusoidal voltage wave having its frequency determined by a signal or recurring pulses while the amplitude thereof is independent of the amplitude or shape of the pulses. Aften, it is desired that the sine wave have a frequency which is an harmonic of the signal pulses. In systems such as television that signal is complex having a varying wave form between pulses. In each instance a desired sine wave voltage must be obtained from the available signal.

It is well known that a square wave voltage has a greater amount of electrical energy in its fundamental sine wave component than has a narrower pulse type wave of the same frequency and amplitude.

Accordingly it is one object of this invention to generate a sinusoidal voltage having a frequency determined by that of a recurring non-sinusoidal signal.

Another object is to generate a sinusoidal voltage having a frequency equal to an integral multiple of the frequency of a recurring impulse component in a synchronizing signal.

Other objects will be apparent after a study of the specification and drawings in which.

Figure 1:
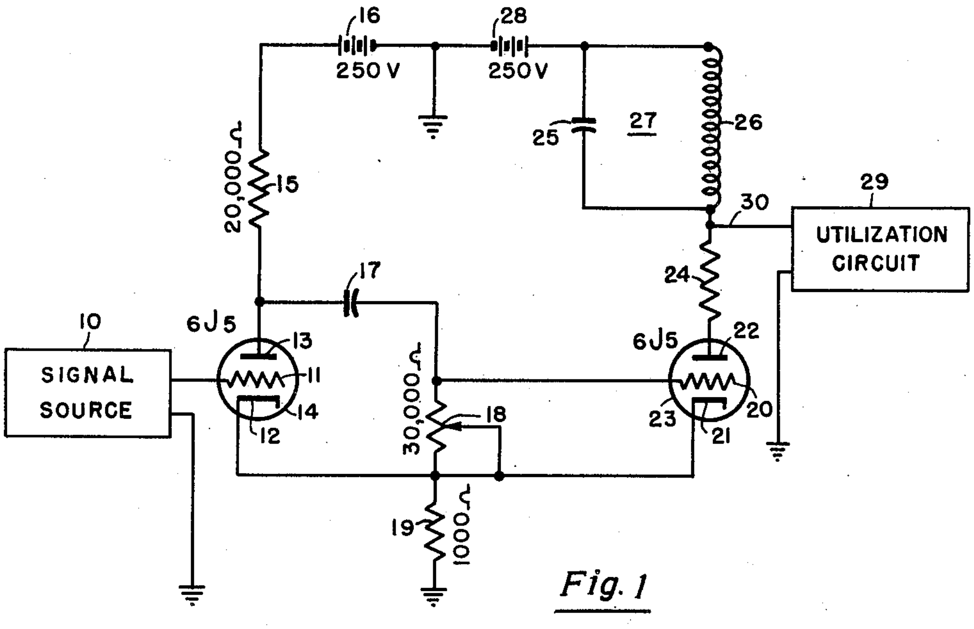
Figure 1 is a circuit diagram of an oscillator in accordance with one embodiment of the invention.
Figure 2:
Figure 2 shows the wave form of a typical television synchronizing voltage.

Referring in more detail to Figure 1, it may be seen that a source 10 of signals which may be, for instance, a preceding amplifier stage in a television transmitter or other television circuit is connected to an input grid 11 of a thermionic tube 14. The anode 13 of the tube 14 is connected through a suitable resistor 15 to a source 16 of positive potential for operation thereof and also through a coupling capacitor 17 to the grid 20 of a second thermionic tube 23. The cathode 12 of the tube 14 is connected through a resistor 19 to ground. The cathode 21 of the second tube 23 is also connected to ground through this same resistor 19. The input grid 20 of the second tube 23 is connected to the cathode lead through a suitable resistor 18 which as may be seen is in series with the resistor 19 to ground. This resistor 18 may be made variable as desired for varying the time constant of the circuit as well understood by those skilled in the art.

The anode 22 of the second tube 23 is connected through a tuned circuit 27 to a source 28 of positive potential. This latter source 28 of positive potential may be the same source as provided for operation of the first tube 14, if desired. The tuned circuit 27 preferably comprises a capacitance 25 in parallel with an inductance 26. Additional plate load resistance 24 may be connected to the anode 22 of the tube 23 if desired to increase this plate resistance for reasons which will hereinafter be explained in connection with the operation of the circuit.

A utilization circuit 29 which may be the desired television circuit utilizing a sinusoidal wave having a frequency which is equal to or a multiple of that of the television synchronizing pulses, is connected by a suitable lead 30 to the anode 22 of the tube 23 and the tuned circuit 27.

The circuit thus described will be recognized as a form of multivibrator circuit known as a single-shot or single-acting multivibrator which requires a triggering impulse to fire or change the state of operation of the circuit.

Figure 3:
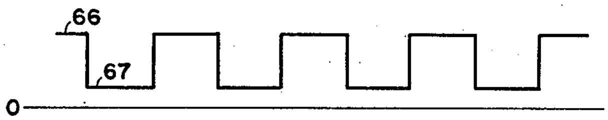
Figure 3 shows a typical voltage wave form generated by the oscillator shown in Figure 1.

The operation of the complete circuit in Figure 1 is as follows: At the start of the operation, vacuum tube 23 is drawing plate current from battery 28 through inductance 26. This current flows through resistor 19 to ground raising the voltage of cathodes 12 and 21 above ground by an amount equal to the voltage drop across resistance 19. This voltage drop may be made high enough so that the grid 11, which is normally at ground potential, is sufficiently negative with respect to cathode 12 to prevent tube 14 from drawing plate current. Therefore, there will be no voltage drop across resistor 15, and condenser 17 will be charged to a voltage equal to the difference between the voltage of battery 16 and the voltage of cathode 21. When the synchronizing voltage from signal source 10 causes grid 11 to go far enough above cutoff to allow tube 14 to draw plate current, this plate current flowing through resistor 15 causes a voltage drop thereacross. Plate 13 is no longer at the potential of battery 16. Figure 3, which shows approximately the wave form to be found at plate 13, illustrates the voltage drop due to plate current flowing through resistor 15 by the sharp drop from level 66, which is the voltage of battery 16 to level 67, which is the voltage between plate 13 and ground when vacuum tube 14 draws current.

Figure 4:
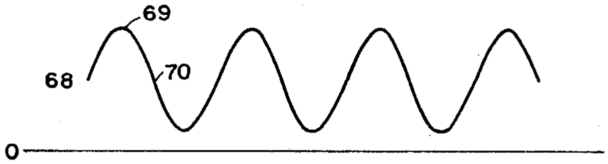
Figure 4 shows the desired sinusoidal voltage output from the oscillator of Figure 1.
Figure 5:
Figures 5 and 6 show voltage wave forms corresponding to those shown in Figures 3 and 4, respectively, when it is desired to obtain the second harmonic of the synchronizing voltage.

Since the voltage across condenser 17 cannot change instantaneously, the voltage between grid 20 and ground is suddenly reduced by a value equal to the voltage drop across resistor 15. As a result grid 20 is driven sufficiently negative with respect to cathode 21 to cut off the plate current through tube 23. By virtue of the inherent properties of inductance, the current through the inductance 26 immediately starts to charge condenser 25 so that lead 30 is raised from its former potential, which was essentially the potential of the battery 28. In Figure 4, which shows the voltage between lead 30 and ground, reference character 68 indicates the voltage of battery 28. As condenser 25 charges, the current through the inductance 26 decreases sinusoidally until the condenser is fully charged. At this time one fourth of the cycle of the sine wave has been completed as indicated by level 69 in Figure 4. When condenser 25 is fully charged, the current through inductance 26 ceases. Condenser 25 immediately starts discharging through inductance 26 with the result that current flows through inductance 26 in a direction opposite to or negative with respect to the original direction. This current increases negatively until condenser 25 is completely discharged as shown at point 70.

During the period that condenser 25 was charging and discharging, condenser 17 was discharging through resistors 15, 18 and 19. The time constant of condenser 17 and resistors 15, 18 and 19 is chosen in accordance with well known principles so that condenser 17 discharges to the point where vacuum tube 23 starts to draw plate current just as condenser 25 returns to its original, discharged condition. This plate current flows to ground through resistor 19 and acts, in the cumulative manner well known in the multivibrator art, to cut off the plate current of vacuum tube 14 practically instantaneously.

The negative current through inductance 26 cannot stop instantly after discharging condenser 25 but must decrease gradually. As it decreases, it starts to charge condenser 25 in the negative direction and this action causes the current to die out in a sinusoidal fashion exactly as it did during the first quarter cycle. The plate resistance 24 is used to keep the positive plate current from discharging condenser 25 too rapidly and thus distorting the sinusoidal wave form, but it may be dispensed with if the plate resistance of vacuum tube 23 is sufficiently high. For this reason a pentode is sometimes used instead of triode 23 shown. By the time condenser 25 is fully discharged and the current through inductance 26 has reached its original value and direction, the cycle is finished and a new synchronizing signal applied to grid 11 starts a new cycle.

The square wave can insert energy into a tuned output or tank circuit during no more than half of each cycle of the tank oscillation. The same principle applies when the tank is tuned to a multiple of the fundamental frequency. As an example, when the tank is tuned to the second harmonic the energy can be inserted only during half of every other cycle. Therefore the wave applied to the tank circuit can no longer be a square wave but must be a pulse wave having an "on" period of no more than one-fourth of its total period. The ratio of the "on" period to the total period between successive positive-going portions of the pulse wave is commonly known as the duty cycle.

Figure 6:
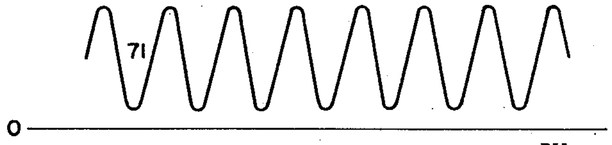

When it is desired to obtain the second harmonic sine wave of the input signal, the time constant of condenser 17 and resistor 18 is adjusted so that when the plate current of vacuum tube 23 is cut off, it will remain off while the tuned circuit of inductance 26 and capacitor 25 goes through one and one-half cycles. At the time the tuned circuit starts the second half of the second cycle as indicated by reference character 71 in Figure 6, vacuum tube 23 starts to conduct and supplies power to the tuned circuit until the next synchronizing pulse causes vacuum tube 23 to be cut off at the start of the third cycle of the tuned circuit. If the synchronizing signal has the same fundamental frequency as before and it is desired to obtain the second harmonic of that frequency, the tuned circuit must, of course, be retuned either by changing inductance 26 or capacitance 25.

Typical values for the circuit of Figure 1 when used to transform 60 cycle pulses into a 60 cycle sine wave in a television camera control unit are illustrated in the drawing.

In the example given the plate resistance of vacuum tube 23 accomplishes the function of resistance 24 and resistor 18 has a predetermined fixed value.

While the particular circuit shown represents the preferred embodiment, it will be understood by those skilled in the art that modifications are possible without departing from the scope of the invention.

What is claimed is:

An electronic generator of a sinusoidal voltage of a predetermined frequency comprising a multivibrator of a single-acting type having a first and a second thermionic tube, a source of assymmetrical rectangular triggering impulses repetitive at said predetermined frequency connected to the grid of said first tube, a parallel circuit consisting of inductance and capacitance tuned to said predetermined frequency and a resistor connected in series between said tuned circuit and the anode of said second tube, a variable resistor connected in the grid circuit of said second tube for varying the duration of unidirectional pulse output of said tubes, and a utilization circuit connected to a point between said tuned circuit and said first named resistor.

ALBERT J. BARACKET.

REFERENCES CITED

The following references are of record in the file of this patent:

UNITED STATES PATENTS

| Number | Name | Date |
|---|---|---|
| 2,395,368 | Bull | Feb. 19, 1946 |
| 2,423,304 | Fitch | July 1, 1947 |
| 2,426,996 | Goodall | Sept. 9, 1947 |
| 2,434,920 | Grieg | Jan. 27, 1948 |
| 2,436,808 | Jacobsen | Mar. 2, 1948 |